United States Patent [19]
Plumley

[11] Patent Number: 5,679,425
[45] Date of Patent: Oct. 21, 1997

[54] HOSE FOR FUEL HANDLING SYSTEMS

[75] Inventor: Stephen Plumley, Paris, Tenn.

[73] Assignee: Plumley Companies, Inc., Paris, Tenn.

[21] Appl. No.: 643,402

[22] Filed: May 6, 1996

Related U.S. Application Data

[63] Continuation of Ser. No. 348,139, Nov. 23, 1994, abandoned.

[51] Int. Cl.$^6$ .................................... F16L 11/04
[52] U.S. Cl. .................. 428/35.7; 428/36.1; 428/36.8; 428/36.91; 428/421; 138/126; 138/137; 138/141
[58] Field of Search ............... 428/35.7, 36.1, 428/36.8, 36.91, 421; 138/126, 137, 141

[56] References Cited

U.S. PATENT DOCUMENTS

| | | | |
|---|---|---|---|
| H1437 | 5/1995 | Spelthann | 525/190 |
| 2,991,808 | 7/1961 | Siegmann et al. | 138/141 |
| 3,913,625 | 10/1975 | Gazda et al. | 138/140 |
| 4,104,095 | 8/1978 | Shaw | 156/83 |
| 4,330,017 | 5/1982 | Satoh et al. | 138/126 |
| 4,510,974 | 4/1985 | Natori et al. | 138/137 |
| 4,603,712 | 8/1986 | Krause | 138/137 |
| 4,614,208 | 9/1986 | Skarelius | 138/103 |
| 4,800,109 | 1/1989 | Washizu | 428/34.9 |
| 4,802,938 | 2/1989 | Kitami et al. | 156/149 |
| 4,806,351 | 2/1989 | Sugimoto et al. | 428/421 |
| 4,881,576 | 11/1989 | Kitami et al. | 138/125 |
| 4,887,647 | 12/1989 | Igarashi et al. | 138/126 |
| 4,981,912 | 1/1991 | Kurihara | 525/326.3 |
| 4,998,564 | 3/1991 | Igarashi et al. | 138/126 |
| 5,038,833 | 8/1991 | Brunnnhofer | 138/137 |
| 5,093,166 | 3/1992 | Nishimura | 428/36.2 |
| 5,170,011 | 12/1992 | Martucci | 174/47 |
| 5,217,797 | 6/1993 | Knox et al. | 428/246 |
| 5,218,026 | 6/1993 | Toda et al. | 525/255 |
| 5,223,571 | 6/1993 | Igarashi et al. | 525/58 |
| 5,264,262 | 11/1993 | Igarashi | 428/36.9 |
| 5,284,184 | 2/1994 | Noone et al. | 138/121 |
| 5,343,738 | 9/1994 | Skaggs | 73/40.5 R |
| 5,507,320 | 4/1996 | Plumley | 138/126 |

*Primary Examiner*—Kathleen Choi
*Attorney, Agent, or Firm*—Longacre & White

[57] ABSTRACT

A laminated hose is present which is suitable for a fuel conducting hose or other hose, or diaphragm, used for example in an automotive vehicle, which structure is required to have excellent heat resistance and gasoline permeation resistance while maintaining suitable properties of bonding and flexibility. The hose is constituted by an inner veneer layer of THV, a terpolymer of tetrafluoroethylene, hexafluoropropylene and vinylidene fluoride, as a permeation barrier layer. This inner layer is reinforced by an elastomeric tie layer, a reinforcing layer and an elastomeric cover.

17 Claims, 1 Drawing Sheet

HOSE FOR FUEL HANDLING SYSTEMS

This is a continuation of application Ser. No. 08/348,139, filed Nov. 23, 1994, which was abandoned upon the filing hereof.

FIELD OF THE INVENTION

The present invention relates in general to a laminated rubber structure and in particular to such a rubber or article suitable for a fuel conducting hose or other hose, or diaphragm, used for example in an automotive vehicle, which structure is required to have superior heat resistance and gasoline permeation resistance while maintaining suitable properties of interlayer bonding and flexibility.

DESCRIPTION OF RELATED ART

There has conventionally been used a multi-layered or laminated rubber structure as a fuel transporting hose for an automobile. For example, there is known a fuel transporting hose constituted by three layers superimposed on each other, that is, a heat resistant and gasoline resistant inner tube, a weather resistant outer tube, and a reinforcing layer interposed between the inner and outer tubes.

In conventional automotive fuel hoses, usually nitrile rubber (acrylonitrile-butadiene rubber) is utilized as a fundamental material of an innermost layer of the hoses and chloroprene rubber as a covering material.

Recently, automobile fuel systems have become considerably more complicated due to the enactment of various measures to achieve satisfactory control of exhaust emission. In many recent automobile models, gasoline flowing through the fuel lines is liable to undergo a considerable rise in temperature by the influence of exhaust emission control means and fuel injection systems. There is therefore a strong possibility that the heated gasoline is partially oxidized to form "sour gasoline" which is highly erosive to many organic materials including synthetic rubbers. In fuel injected automobiles, an erosive action of sour gasoline on the material of the fuel hose is further promoted by the pressure applied to the fuel. Such systems result in high permeation rates which increase emissions.

When such change in the condition of the fuel system is taken into consideration, nitrile rubber as the fuel hose material is no longer satisfactory in its heat resistance and oxidation resistance. In other words, there arises a problem that automotive fuel hoses which employ nitrile rubber as the fundamental material have a short service life. Since deterioration of the fuel hose is liable to result in fuel leakage and hence constitute a serious danger, the need exists for a fuel hose having sufficient resistance to sour gasoline, and permeation associated therewith.

Attention has been given to relatively recently developed synthetic rubbers, particularly to fluorine rubbers (fluorine-containing hydrocarbon elastomers) and epichlorohydrin rubbers as fuel hose materials superior to nitrile rubber in heat and solvent resistance. However, practical applications of these materials have several drawbacks.

Fluorine rubber is excellent in heat resistance and solvent resistance and has been regarded as sufficiently resistant even to sour gasoline. However, since fluorine rubber has no double bond in its polymer, it does not bond easily to other materials and is not satisfactory in its resistance to cold. Thus, during use particularly in extreme conditions, hoses employing a fluororubber at the inner layer may peel or separate form the outer layer.

Epichlorohydrin rubber is excellent in its resistance to cold but is rather poor in its resistance to oxidized fuel, particularly in a heated or pressurized state. Therefore, it is impermissible to use epichlorohydrin rubber as the material for an innermost layer of an automotive fuel hose.

Some synthetic resins other than synthetic rubbers have also been employed for conventional organic liquids. For instance, U.S. Pat. No. 5,170,011 to Martucci discloses a hose comprising a tube of a polymeric fluorocarbon material such as nylon or Teflon as the innermost layer with a tubular rubber layer of larger thickness covering the outside of the resin tube. However, nylon and Teflon do not bond well to the outer rubber layer, and lack sufficient flexibility since neither nylon nor Teflon exhibit rubbery or elastomeric behavior. It is therefore not suitable to use this hose as an automotive fuel hose. If so, it would be necessary to employ special clamps and bandage tubes for the purpose of precluding the occurrence of fuel leaks during long operation of the fuel system, because this hose is inferior to true rubber hoses in rubbery resiliency, flexibility, and bendability. Moreover, this hose will lack durability due to the separation tendency of its rubber covering layer from the synthetic resin tube.

Alcohol and aromatic compounds in the fluid conveyed through these tubes diffuse at different rates through the tubing wall from the aliphatic components. The resulting change in the composition of the liquid in the tubing can change the solubility thresholds of the material so as to be able to crystallize monomers and oligomers of materials such as Nylon 11 and Nylon 12 in the liquid. The presence of copper ions, which can be picked up from the fuel pump, accelerates this crystallization. The crystallized precipitate can block filters and fuel injectors and collect to limit travel of the fuel pump or carburetor float as well as build up on critical control surfaces of the fuel pump.

In U.S. Pat. No. 5,038,833 to Brunnhofer, a three layer fuel line without the resistance to monomer/oligomer dissolution is proposed in which a tube is formed having a co-extruded outer wall of Nylon 11 or Nylon 12, an intermediate alcohol barrier wall formed from an ethylene-vinyl alcohol copolymer, and an inner water-blocking wall formed from a polyamide such as Nylon 11 or Nylon 12.

U.S. Pat. No. 5,093,166 to Nishimura discloses a laminated rubber structure including a layer formed of fluororubber (FKM) and a layer formed of acrylonitrile-butadiene rubber (NBR) superposed on the FKM layer. The first (FKM) and second (NBR) layers are chemically bonded to each other by crosslinking between the copolymer and the acrylonitrile-butadiene rubber by means of a peroxide-crosslinking unit. This structure however suffers from the drawback that it is limited to the use of NBR and the necessarily requires a peroxide-crosslinking unit.

Therefore, the need exists for a fuel hose which exhibits ultra low permeation rates while maintaining satisfactory flexibility and durability when exposed to extreme temperature, pressure and bending conditions, which is not restricted to NBR or crosslinking, and moreover, which does not react with the components of the fluid being conveyed therein.

SUMMARY OF THE INVENTION

It the object of the instant invention to provide a material for handling hydrocarbon fuels, and in particular a fuel hose arrangement, which does not suffer from the drawbacks present in the prior art.

The invention provides a material fuel handling systems, and particularly for a fuel line suitable for gasoline handling systems, where ultra low permeation rates are required. The invention provides a fuel hose which provides a reduction in emissions rates in the range of 92% when compared to conventional fluoroelastomer hoses. These superior rates are true for unleaded gasolines as well as reformulated gasolines (ethers, alcohols, etc.).

The invention provides a laminated rubber structure including a thin veneer of THV, which is a terpolymer of tetrafluoroethylene, hexafluoropropylene and vinylidene fluoride, as a permeation barrier layer. The structure of the invention exhibits ultra low permeation rates and excellent bonding properties of the permeation barrier layer to adjacent rubber layers.

In the preferred embodiment, the material or fuel hose of the invention consists of a veneer of THV bonded to a secondary organic rubber compound, reinforced with a synthetic fabric, and covered with an additional organic rubber compound to complete the entire hose construction of the preferred embodiment. The laminated rubber structure of the invention therefore provides a fluoroplastic veneer of THV on the fluid-engaging surface, which is bondable to a variety of conventional rubbers without the encumbrance of crosslinking.

The invention further sets forth a novel bonding arrangement between the THV veneer and the adjacent rubber layer. The bonding arrangement utilizes a chemistry comprising an organic peroxide, an epoxy compound, a cyanate compound, and a complex decene compound.

The following is a description of the invention which is not intended to limit the scope of the invention but rather describe the preferred embodiment thereof. The description includes claims and a drawing forming parts thereof.

DETAILED DESCRIPTION OF THE PREFERRED EMBODIMENT

Figure 1:
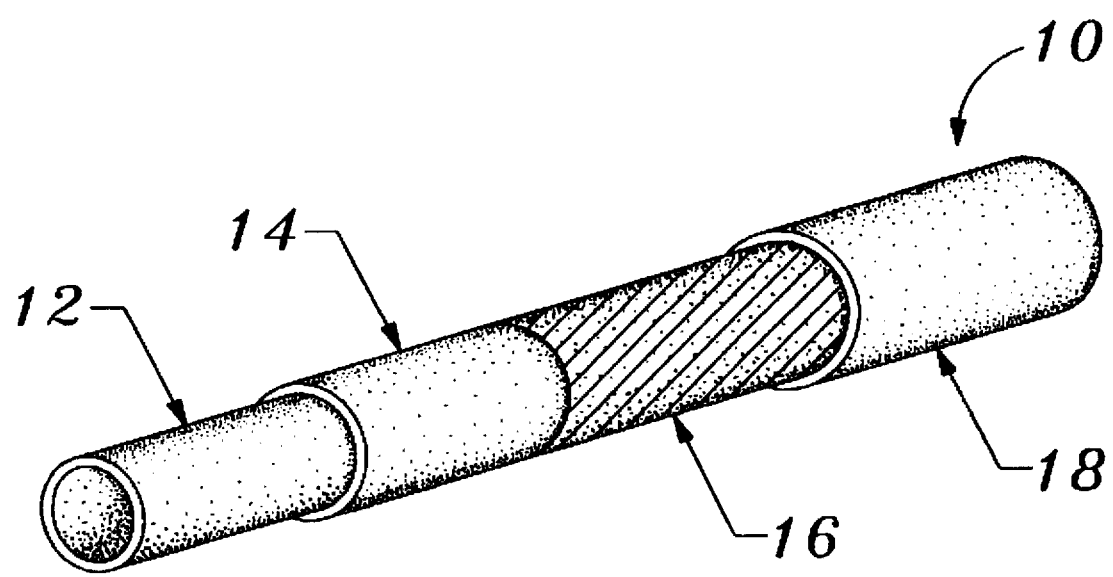
FIG. 1 is a perspective cross-sectional view illustrating the construction of a fuel hose constructed in accordance with the invention.

The above and optional features and advantages of the present invention will be better understood with reference to the following detailed description of the invention. The laminated rubber structure according to the present invention is by no means limited to a specific shape but may take various shapes in accordance with the desired application.

With reference to FIG. 1 there is shown a fuel transporting hose 10 in a multi-layered arrangement comprising an inner layer 12 in the form of a veneer of a fluoroplastic of THV (a terpolymer of tetrafluoroethylene, hexafluoropropylene and vinylidene fluoride). In the preferred embodiment, the THV layer 12 comprises a mole % of approximately 20% vinylidene fluoride, 60% tetrafluoroethylene, and 20% hexafluoropropylene; and has a thickness in the range of about 0.010" to 0.015". It is noted that THV is a fluoroplastic which exhibits improved gasoline permeation resistance in accordance with the primary objective of the invention.

Backing the inner layer 12 is a secondary organic rubber compound in the form of an elastomeric tie layer 14. The tie layer 14 is formed of a suitable elastomer possessing requisite flexibility and durability to separate the THV layer 12 from any additional layers provided for reinforcement and support. The intermediate tie layer 14, in addition to permitting a homogeneous bond between the inner and outer layers, preferably exhibits additional resistance to permeation of fuel components.

A reinforcing layer 16 is provided radially outwardly of the inner layer 12, and tie layer 14 in a conventional manner. For example, the reinforcing layer 16 may be formed by braiding, spiralling or knitting a thread consisting essentially of a synthetic fiber such as vinylon fiber, polyester fiber or aramid fiber, or a natural fiber such as cotton. Reinforcing layer 16 may be a single or double layer of braided synthetic fibers such as braided 12-Nylon fibers.

A seamless, protective organic rubber cover layer 18 is formed on the reinforcing layer 16. The cover layer 18 is preferably non-reactive with the external environment and can withstand various shocks, vibrational fatigue, and changes in temperature as well as exposure to various corrosive or degradative compounds to which it would be exposed during the normal course of operation of the motor vehicle. Thus, the outer layer 18 may be composed of any elastomeric compound which is resistant to ultraviolet degradation, and extreme changes in temperature. Accordingly, ethylene-acrylic rubber, chloroprene rubber or epichlorohydrin rubber is preferable as the material of layer 18.

The elastomeric tie layer 14 is thus covered intimately with a tubular reinforcing layer 16 of a fibrous material. Since the role of this reinforcing layer 16 is to afford sufficient physical strength and heat resistance to the finished hose, it is preferable that this layer 16 takes the form of a braid of glass fiber which is highly resistant to heat, cotton fiber or a strong and relatively heat-resistant synthetic fiber such as polyester fiber, polyamide fiber or partially acetal-formed polyvinyl alcohol fiber (vinylon fiber).

Of particular novelty in the instant invention is the bonding arrangement between the THV layer 12 and the tie layer 14. Specifically, the fluoroplastic layer 12 is treated to promote adhesion, preferably by a corona discharge treatment. Moreover, the elastomeric tie layer 14 adjacent to the THV layer 12 may be an elastomer copolymerized with a polar comonomer. Adhesion will be further positively induced via utilization of a peroxide vulcanization system.

Table I below sets forth the specific details of the subject formula for bonding the fluoroplastic layer 12 and the elastomeric tie layer 14 and embodies the preferred embodiment of the invention. The beneficial features of the chemistry set forth below are fivefold: an organic peroxide, an epoxy compound, a cyanate compound, and a complex decene compound. It is noted that the elements listed in Table I are set forth in parts per hundred rubber.

TABLE I

| (parts per hundred rubber) | |
| --- | --- |
| Medium ACN NBR | 100.0 |
| Zinc Oxide | 5.0 |
| Stearic Acid | 2.0 |
| Paraffin | 1.0 |
| Fatty Acid Ester | 1.0 |
| Carbon Black | 55.0 |
| Dioctyl Phthalate | 5.0 |
| Octylated Phenylamine | 1.0 |
| Trialyl Isocyanurate | 1.0 |
| 2,5-Dimethyl-2,5-bis(t-butylperoxy) hexane | 0.7 |
| Chloromethyl oxirane | 2.0 |
| Magnesium Oxide | 20.0 |
| 1,8-Diazabicyclo [−5.4.0] undec-7-ene, 98% | 1.0 |

Table I above provides an organic peroxide in the form of 2,5-Dimethyl-2,5-bis(t-butylperoxy)hexane. An epoxy compound is provided in the form of Chloromethyl oxirane. Triallyl Isocyanurate provides the cyanate compound of the above formula. The complex decene compound of the invention is 1,8-Diazabicyclo[-5.4.0]undec-7-ene, 98%. It is noted that the above formula and specific ratios provided thereby sets forth only one formula to achieve the objects of the invention. Changes in form and detail may be made by those skilled in the art without departing from the spirit and scope embodied therein.

From the foregoing, it is noted that the inner layer 12 comprising a veneer of THV has been shown to reduce emissions in the range of 92% when compared with conventional fluoroelastomer hoses. This superior emission reduction rate is true for both unleaded gasolines and reformulated gasolines, i.e. ethers, alcohols, etc. Moreover, the fuel hose of the invention is suitable for internal combustion engines whether utilizing an electronic fuel injector or a traditional carburetor.

It is further noted that the structural arrangement of the invention provides a substantial improvement over the prior art arrangement having an inner lining solely comprised of fluororubber. The bonding properties exhibited by the arrangement of the invention maintains a suitable flexibility without exhibiting the separating or peeling drawbacks exhibited by the prior art. Because the structure of the invention is suitably flexible, it can readily be applied to automobile fuel systems.

The foregoing invention thus provides a rubber laminate with improved heat resistance and permeation resistance. The THV inner layer of the invention is not intended to be limited to fuel hoses, but may be employed in all fuel handling systems, i.e. storage tanks, pumping arrangements, etc. as will be understood by those of skill in the art.

While the foregoing invention has been shown and described with reference to a specific embodiment, it will be understood by those of skill in the art that various changes in form and detail may be made therein without departing from the spirit and scope of the invention.

What is claimed is:

1. A hose for containing a fuel, comprising:

a thermoplastic inner layer which is resistant to permeation of hydrocarbon fuels, said thermoplastic inner layer being formed of a terpolymer comprising tetrafluoroethylene, hexafluoropropylene, and vinylidene fluoride;

a tie layer bonded to said inner layer;

a tubular reinforcing layer of a fibrous material covering said tie layer;

a tubular protective layer of a synthetic rubber intimately covering said reinforcing layer; and a bonding chemistry bonding said inner layer to said tie layer, said bonding chemistry comprising a cyanate compound, an epoxy and a complex decene compound.

2. The hose according to claim 1, wherein said tie layer defines an elastomer copolymerized with a polar comonomer.

3. The hose according to claim 1, wherein said terpolymer comprises a mole percent of approximately 60% tetrafluoroethylene, 20% hexafluoropropylene, and 20% vinylidene fluoride.

4. The hose according to claim 1, wherein adhesion of said tie layer to said inner layer is enhanced by a peroxide vulcanization system comprising an organic peroxide.

5. The hose according to claim 4, wherein said organic peroxide is 2,5-Dimethyl-2,5-bis(t-butylperoxy)hexane.

6. The hose according to claim 1, wherein said cyanate compound is triallyl isocyanurate.

7. The hose according to claim 1, wherein said complex decene compound is 1,8-Diazabicyclo[5,4,0]undec-7-ene, 98%.

8. The hose according to claim 1, wherein said tubular reinforcing layer comprises braided synthetic fibers, and said tubular protective layer defines a seamless protective covering.

9. A laminated extruded material for containing a fuel, comprising:

a thermoplastic inner layer formed of a terpolymer comprising tetrafluoroethylene, hexafluoropropylene, and vinylidene fluoride;

a tie layer bonded to said inner layer:

a protective covering layer comprising an organic rubber covering said tie layer;

and wherein a bonding chemistry bonds said inner layer to said tie layer, said bonding chemistry comprising a cyanate compound, an epoxy and a complex decene compound.

10. The laminated extruded material according to claim 9, wherein said inner layer comprises a mole percent of approximately 60% tetrafluoroethylene, 20% hexafluoropropylene, and 20% vinylidene fluoride.

11. The laminated extruded material according to claim 9, wherein said inner layer has a thickness ranging from about 0.01" to 0.015".

12. The laminated extruded material according to claim 9, wherein said protective covering layer comprises:

a tubular reinforcing layer of a heat resistant fibrous material covering said tie layer; and a tubular protective layer of a synthetic rubber intimately covering said reinforcing layer.

13. The laminated extruded material according to claim 9, where said bonding chemistry further comprises a peroxide vulcanization system comprising an organic peroxide.

14. The laminated extruded material according to claim 13, wherein said organic peroxide is 2,5-Dimethyl-2,5-bis(t-butylperoxy)hexane.

15. The laminated extruded material according to claim 9, wherein said cyanate compound is triallyl isocyanurate.

16. The laminated extruded material according to claim 9, wherein said complex decene compound is 1,8-Diazabicyclo (5,4,0)undec-7-ene, 98%.

17. The laminated extruded material according to claim 9, wherein said epoxy is chloromethyl oxirane.

* * * * *